United States Patent [19]

Furukawa et al.

[11] Patent Number: 4,471,093

[45] Date of Patent: Sep. 11, 1984

[54] ELASTOMER COMPOSITION COMPRISING A BLEND OF SBR RUBBERS

[75] Inventors: Hiroshi Furukawa, Ashiya; Yuichi Saito, Nishinomiya; Keisaku Yamamoto, Ichihara; Akio Imai, Ichihara; Nobuyuki Yoshida, Ichihara; Yasushi Okamoto, Ichihara, all of Japan

[73] Assignees: Sumimoto Rubber Industries, Ltd., Kobe; Sumitomo Chemical Company, Limited, Osaka, both of Japan

[21] Appl. No.: 470,506

[22] Filed: Feb. 28, 1983

[30] Foreign Application Priority Data

Feb. 26, 1982 [JP] Japan ................................. 57-31122
Feb. 26, 1982 [JP] Japan ................................. 57-31123

[51] Int. Cl.$^3$ ............................ C08L 7/00; C08L 9/06
[52] U.S. Cl. ................................................. 525/237
[58] Field of Search ........................................ 525/237

[56] References Cited

U.S. PATENT DOCUMENTS

| | | | |
|---|---|---|---|
| 3,596,697 | 8/1971 | Hansley et al. | 525/237 X |
| 3,978,165 | 8/1976 | Stumpe et al. | 525/237 X |
| 4,220,564 | 9/1980 | Tanimoto et al. | 525/237 |
| 4,373,069 | 2/1983 | Bond et al. | 525/237 |
| 4,383,085 | 5/1983 | Fujimaki et al. | 525/237 X |

*Primary Examiner*—Carman J. Seccuro
*Attorney, Agent, or Firm*—Armstrong, Nikaido, Marmelstein & Kobovcik

[57] ABSTRACT

A rubber composition having improved rolling resistance and wet grip characteristics with improved processability, abrasion resistance and durability which contains as a rubber component a mixture of a high molecular weight styrene-butadiene rubber having a specific microstructure and a low molecular weight styrene-butadiene and/or butadiene rubber having a specific microstructure. The composition is particularly suitable for use in tread of tires.

6 Claims, No Drawings

ELASTOMER COMPOSITION COMPRISING A BLEND OF SBR RUBBERS

BACKGROUND OF THE INVENTION

The present invention relates to an elastomer composition suitable for use in a tread of tires, and more particularly to an elastomer composition containing a mixture of a high molecular weight styrene-butadiene rubber having a specific microstructure and a low molecular weight styrene-butadiene and/or butadiene rubber.

In recent years, reduction of running fuel cost of automobiles is strongly demanded from the viewpoint of energy saving. Therefore, it is of urgent necessity for the tire manufacturing industry to decrease the rolling resistance of tires, thereby decreasing the consumption of travelling energy.

Among the constituent elements of a tire, a tread rubber accounts for the largest proportion of the travelling resistance attended on rolling of the tire, and it is known that the tread rubber accounts for about 40% of the rolling resistance of the tire at large. Further, the motions of the tread rubber in travelling are classified into a bending and shearing motion and a compressive motion, and from the viewpoint of the viscoelastic characteristic of a rubber, the former is related to the loss modulus ($E''$) and the latter is related to the loss compliance [$E''/(E^*)^2$ where $E^*$ is complex modulus]. Further, these motions are repeated motions attended on rotation of tire, and the frequency thereof is from 10 to $10^2$ Hz. Accordingly, it is necessary for the reduction of the rolling resistance of tire to decrease the loss modulus and loss compliance of a tread rubber.

On the other hand, considering from the safety side the wet grip characteristic on a wet road which is the most important characteristic for tires and is an essential characteristic to travelling performances such as steering stability, breaking performance and turning performance on a wet road such as a road at the time of raining, it is a frictional characteristic caused by contact of the tread surface of a tire with the road. The frictional resistance is caused by viscoelastic behavior of a rubber in the surface of the tread against the stress that the rubber receives from the road, namely hysteresis loss due to phase lag. This is related to the loss coefficient (tan $\delta$) from the viewpoint of the viscoelastic characteristic. Further, the frequency of the stress caused by the road is a very high frequency attended on the unevenness of road, and according to a literature, the frequency is from $10^4$ to $10^7$ Hz. Therefore, in order to improve the wet grip characteristic of tires, it is necessary to raise the loss coefficient of a tread rubber in $10^4$ to $10^7$ Hz.

In a tread rubber compound generally and widely used heretofore, natural rubber, synthetic isoprene rubber, synthetic butadiene rubber and styrene-butadiene rubber are mainly used as an elastomer component. The former three are superior in rolling resistance, but are poor in wet grip characteristic. Also, the latter one is superior in wet grip characteristic, but is poor in rolling resistance. Therefore, a tread rubber composition having excellent both properties of the rolling resistance and the wet grip characteristic has not been obtained. A tread rubber composition has been used at the cost of either one property or with keeping balance of the both properties by blending the above-mentioned elastomers.

The present inventors made a study of the repugnant properties, namely rolling resistance and wet grip characteristic, of conventional elastomers as mentioned above, and found as disclosed in Japanese Patent Application No. 157927/1981 that the rolling resistance is related to the viscoelasticity at a frequency of 10 Hz at a temperature of 50° to 65° C. and the wet grip characteristic is related to the viscoelasticity at a frequency of 10 Hz and a temperature of $-30°$ to $-15°$ C. The temperature range of $-30°$ to $-15°$ C. is converted into a frequency ranging from $10^5$ to $10^7$ Hz on the basis of the temperature-frequency relationship, and it agrees with a value described in literatures.

Therefore, it is understood that elastomers having balanced both properties of the rolling resistance and wet grip characteristic are desirable to be those having small loss modulus ($E''$) and loss compliance [$E''/(E^*)^2$] at 10 Hz in a high temperature region (50° to 65° C.) and having a large loss coefficient (tan $\delta$) in a low temperature region ($-30°$ to $-15°$ C.). As elastomers having such a feature, the present inventors propose some elastomers as disclosed in Japanese Unexamined Patent Publication No. 65736/1982, No. 87444/1982, No. 94028/1982 and No. 123236/1982. Also, elastomers similar to such elastomers are disclosed in Japanese Unexamined Patent Publication No. 62248/1979, No. 12133/1980 and No. 143209/1981. These elastomers have well-balanced rolling resistance and wet grip characteristics, but are inferior to conventional elastomers with respect to other properties, e.g. processability in kneading, extruding and molding which is the most important in production of tires, and strength of elastomer such as abrasion resistance and durability.

SUMMARY OF THE INVENTION

The present inventors have made a study of the relation of the above-mentioned properties with respect to styrene-butadiene rubber which is relatively superior in wet grip characteristic, from the viewpoints of microstructure, molecular weight, blending manner, etc., and have now found that various properties such as processability, abrasion resistance and durability are further improved as well as rolling resistance characteristic and wet grip characteristic by admixing a styrene-butadiene rubber having specific 1,2-bonding content in butadiene component, molecular weight distribution and styrene content with a specific low molecular weight polymer.

In accordance with the present invention, there is provided an elastomer composition comprising a mixture of (a) a high molecular weight styrene-butadiene rubber having a styrene content of 15 to 35% by weight, a 1,2-bonding content in the butadiene component of 40 to 70% by mole and an intrinsic viscosity of 2.0 to 6.0 in toluene at 30° C., the ratio of the weight average molecular weight to the number average molecular weight being not more than 2.0 and (b) a low molecular weight polymer selected from the group consisting of a low molecular weight styrene-butadiene rubber having a styrene content of 15 to 35% by weight, a 1,2-bonding content in the butadiene component of 40 to 70% by mole and an intrinsic viscosity of from not less than 0.8 to less than 2.0 in toluene at 30° C., the ratio of the weight average molecular weight to the number average molecular weight being not more than 2.0, and a low molecular weight butadiene rubber having a 1,2-bonding content of 30 to 80% by mole and an intrinsic viscosity of from not less than 0.1 to less than 2.0 in toluene at 30° C.

DETAILED DESCRIPTION

It is necessary for the high molecular and low molecular styrene-butadiene rubbers used in the present invention as components (a) and (b) that the ratio of the weight average molecular weight (Mw) to the number average molecular weight (Mn), namely the Mw/Mn ratio, is not more than 2.0. The value of the Mw/Mn ratio is a measure of molecular weight distribution. The larger the Mw/Mn ratio, in other words, the wider the molecular weight distribution, the more the rolling resistance characteristic tends to lower. Therefore, in the present invention, the Mw/Mn ratio is not more than 2.0, preferably not more than 1.5. The styrene content in the styrene-butadiene rubbers is selected from 15 to 35% by weight. The styrene content participates mainly in wet grip characteristic. When the styrene content is less than 15% by weight, basic characteristics such as tensile strength and tearing strength become worse with remarkable lowering of the wet grip characteristic, and if such a rubber is used as a tire tread, durability of tires is lowered. The larger the styrene content, the more the wet grip characteristic is improved, but when the styrene content exceeds 35% by weight, the rolling resistance characteristic is lowered. The 1,2-bonding content in the butadiene component of the styrene-butadiene rubbers is selected from 40 to 70% by mole. The wet grip characteristic is improved with increasing the 1,2-bonding content, but when the 1,2-bonding content exceeds 70% by mole, tearing strength or abrasion resistance is suddenly lowered. When the 1,2-bonding content is less than 40% by mole, the wet grip characteristic is lowered.

A high molecular weight styrene-butadiene rubber having a structure as mentioned above is employed as a component (a). The intrinsic viscosity $[\eta]$ of the high molecular weight styrene-butadiene rubber is from 2.0 to 6.0 in toluene at 30° C. When the intrinsic viscosity is more than 6.0, processability such as milling or extruding extremely becomes worse, and when the intrinsic viscosity is less than 2.0, the basic characteristics of the composition such as tensile strength and tearing strength are lowered with lowering of the rolling resistance characteristic.

In the present invention, the high molecular weight styrene-butadiene rubber (a) is admixed with a low molecular weight styrene-butadiene rubber having a structure as mentioned above and/or a low molecular weight butadiene rubber as a component (b). The intrinsic viscosity $[\eta]$ of the low molecular weight styrene-butadiene rubber is selected from not less than 0.8 to less than 2.0 in toluene at 30° C. When the intrinsic viscosity is less than 0.8, the rolling resistance characteristic and the basic characteristics are lowered, and when the intrinsic viscosity exceeds 2.0, no improvement in processability of a composition is observed. The intrinsic viscosity $[\eta]$ of the low molecular weight butadiene is selected from not less than 0.1 to less than 2.0. When the intrinsic viscosity is less than 0.1, milling workability and roll workability become worse and properties of a cured rubber are also impaired. When the intrinsic viscosity exceeds 2.0, the processability is not improved.

In case of blending the high molecular weight styrene-butadiene rubber with the low molecular weight styrene-butadiene rubber, the ratio of the high molecular weight polymer to the low molecular weight polymer is preferably from 25/75 to 75/25 by weight, since overall balance between rolling resistance, wet grip characteristic and processability is good. In case of blending the high molecular weight styrene-butadiene rubber with the low molecular butadiene rubber, the ratio of the high molecular weight polymer to the low molecular weight polymer is preferably from 20/80 to 90/10 by weight, especially from 60/40 to 90/10 by weight.

The basic characteristics and processability of a rubber blend are affected by the average molecular weight as a whole. In case of a blend of the high molecular and low molecular styrene-butadiene rubbers, it is desirable that the weighted average value $[\bar{\eta}]$ defined by the following formula of the intrinsic viscosities of the both rubbers is from not less than 1.8 to less than 3.0.

$$[\bar{\eta}] = [\eta]_1 \times \frac{W_1}{100} + [\eta]_2 \times \frac{W_2}{100}$$

$[\eta]_1$: Intrinsic viscosity of a high molecular weight polymer
$[\eta]_2$: Intrinsic viscosity of a low molecular weight polymer
$W_1$: Weight % of a high molecular weight polymer
$W_2$: Weight % of a low molecular weight polymer When the value $[\bar{\eta}]$ is less than 1.8, the basic characteristics are remarkably lowered, and when the value $[\bar{\eta}]$ exceeds 3.0, the processability is remarkably lowered. Also, the difference in intrinsic viscosity between the high molecular and low molecular styrene-butadiene rubbers is a measure of the width of the molecular weight distribution of a rubber blend at large, and preferably, the difference $[\eta]_1 - [\eta]_2$ in intrinsic viscosity is from not less than 0.5 to less than 2.5. When the difference is less than 0.5, improvement in processability of the blend is not obtained, and when the difference is not less than 2.5, the rolling resistance characteristic is lowered. In case of a blend of the high molecular weight styrene-butadiene rubber and the low molecular weight butadiene rubber, it is desirable that the weighted average value $[\bar{\eta}]$ as defined above of the intrinsic viscosities of the both rubbers is not less than 2.0. When the value $[\bar{\eta}]$ is less than 2.0, the rolling resistance and wet grip characteristics are lowered as well as basic characteristics such as tearing strength and abrasion resistance.

The high molecular weight rubber and the low molecular weight rubber are blended in a usual manner. For instance, the both are admixed in the form of solutions after the completion of the polymerization, or two kinds of the dry polymers are mechanically blended by means of heat rolls, etc. In the present invention, the rubbers having different structures of two or more kinds can be of course employed so long as they satisfy the above-mentioned conditions such as microstructure and molecular weight.

In the present invention, 5 to 50% by weight of the rubber component may be natural rubber, synthetic isoprene rubber or a mixture thereof in all proportions. By employing the specific blend of the high molecular styrene-butadiene rubber and the low molecular styrene-butadiene and/or butadiene rubber in combination with natural rubber and/or synthetic isoprene rubber as a rubber component of an elastomer composition, processability, particularly bagging, sheet skin, shrinking and tackiness at the time of roll working are further improved and the tearing strength of a rubber is also improved. Consequently, damage of the tread portion upon releasing of a cured rubber from a mold, namely demould splitting, is prevented. When the proportion of natural rubber and/or synthetic isoprene rubber in the rubber component is more than 50% by weight, the features of the blend of the high molecular and low molecular rubbers, particularly wet grip characteristic, are impaired. Preferably, the proportion of the natural rubber and/or synthetic isoprene rubber in the rubber component is from 10 to 40% by weight, since the respective characteristics are exhibited in a good balance.

Usual additives ae incorporated into the rubber component to provide an elastomer composition, e.g. carbon black, process oil, wax, antioxidant, curing agent and curing accelerator.

The elastomer composition of the present invention is particularly suitable for use in tread of tires for passenger cars, light trucks, trucks and buses, and is capable of providing tires having excellent both the rolling resistance and wet grip characteristic.

The present invention is more specifically described and explained by means of the following Examples, in which all parts and % are by weight unless otherwise noted. It is to be understood that the present invention is not limited to the Examples, and various changes and modifications may be made in the invention without departing from the spirit and scope thereof.

EXAMPLES 1 to 3 AND COMPARATIVE EXAMPLES 1 TO 5

Various rubber compositions were prepared by mixing a rubber or a blend of a high molecular styrene-butadiene rubber (a) and a low molecular styrene-butadiene rubber (b) as shown in Table 1 with additives according to the following formulation.

| Components | Amount (part) |
|---|---|
| Rubber | 100 |
| Carbon black N 339 (commercial name "Showblack" made by SHOWA DENKO K.K.) | 50 |
| Aromatic oil | 3 |
| Wax | 2 |
| N—Isopropyl-N'—phenyl-p-phenylenediamine (antioxidant) | 2 |
| Stearic acid | 1 |
| Zinc oxide | 3 |
| Sulfur | 1.75 |
| N—Cyclohexyl-2-benzothiazyl-sulfenamide (curing accelerator) | 1 |

The processability and viscoelasticity of the compositions were measured, and also the rolling resistance characteristic and wet grip characteristic of the compositions applied to a tread of tire were evaluated.

The results are shown in Table 2.

The measurements were conducted as follows:

(1) Viscoelasticity of rubber composition

The viscoelasticity characteristics such as loss modulus and loss coefficient were measured by employing a viscoelasticity spectrometer made by Kabushiki Kaisha Iwamoto Seisakusho. The loss compliance was measured at 10 Hz in frequency and 2% in amplitude, and the loss coefficient was measured at 10 Hz in frequency and 0.5% in amplitude. The results of the loss modulus and loss compliance measured at 65° C. and the integral value from −30° C. to −15° C. of the loss coefficient are shown in Tables.

(2) Processability of rubber composition

The bagging property and sheet skin of a composition wound round an 8 inch roll were observed by the eye, and also the tackiness of the sheet was measured by a tack meter made by Toyo Seiki Kabushiki Kaisha.

(3) Rolling resistance of tire

A steel radial tire of 165SR13 in size was prepared by using a rubber composition in the tread portion of the tire. The rolling resistance was measured by causing the tire to run on a 60 inch drum under conditions of 80 km./hour in speed, 2.0 kg./cm.$^2$ in inner pressure and 300 kg. in load. The rolling resistance is shown in Table 2 as an index to the result of Comparative Example 1 using a high molecular weight styrene-butadiene rubber alone as a rubber component. The smaller the rolling resistance index, the more excellent the rolling resistance characteristic.

(4) Wet grip characteristic of tire

Steel radial tires of 165SR13 in size were prepared by using a rubber composition in the tread portion of the tire, and they were attached to a 1500 cc. passenger car. The car was run on a slippery concrete road sprinkled with water at a speed of 60 km./hour with one passenger. The friction coefficient was calculated from the stopping distance. It is shown as an index to the value for Comparative Example 1. The larger the wet grip index, the better the wet grip characteristic.

TABLE 1

|  | Com. Ex. 1 | Com. Ex. 2 | Com. Ex. 3 | Com. Ex. 4 | Com. Ex. 5 | Ex. 1 | Ex. 2 | Ex. 3 |
|---|---|---|---|---|---|---|---|---|
| High molecular SBR (a) (part) | 100* | natural rubber 100 | 100 | 80 | 80 | 25 | 50 | 50 |
| Low molecular SBR (b) (part) | — | — | — | 20 | 20 | 75 | 50 | 50 |
| Intrinsic viscosity $[\eta]_1$ of SBR (a) | 1.8 | — | 3.48 | 3.21 | 4.42 | 3.48 | 3.48 | 3.48 |
| Intrinsic viscosity $[\eta]_2$ of SBR (b) | — | — | — | 0.61 | 0.39 | 1.55 | 1.35 | 0.96 |
| Weighted average intrinsic viscosity $[\bar{\eta}]$ | — | — | — | 2.69 | 3.61 | 2.03 | 2.42 | 2.22 |
| Difference in intrinsic viscosity $[\eta]_1 - [\eta]_2$ | — | — | — | 2.60 | 4.03 | 1.93 | 2.13 | 2.52 |
| High molecular SBR (a) |  |  |  |  |  |  |  |  |
| Styrene content (%) | 23.5 | — | 21 | 20 | 20 | 21 | 21 | 21 |
| 1,2-Bonding content in butadiene component (mol %) | 18 | — | 53 | 65 | 65 | 53 | 53 | 53 |
| Low molecular SBR (b) |  |  |  |  |  |  |  |  |
| Styrene content (%) | — | — | — | — | 20 | 19 | 20 | 20 |
| 1,2-Bonding content in | — | — | — | 25 | 52 | 58 | 61 | 61 |

TABLE 1-continued

|  | Com. Ex. 1 | Com. Ex. 2 | Com. Ex. 3 | Com. Ex. 4 | Com. Ex. 5 | Ex. 1 | Ex. 2 | Ex. 3 |
|---|---|---|---|---|---|---|---|---|
| butadiene component (mol %) | | | | | | | | |

(Note)
*Styrene-butadiene rubber (commercial name "SBR 1500" made by Sumitomo Chemical Co., Ltd.) (Mw/Mn = 3.2)

TABLE 2

|  | Com. Ex. 1 | Com. Ex. 2 | Com. Ex. 3 | Com. Ex. 4 | Com. Ex. 5 | Ex. 1 | Ex. 2 | Ex. 3 |
|---|---|---|---|---|---|---|---|---|
| Viscoelasticity | | | | | | | | |
| Loss modulus (kg · f/cm.$^2$) | 16.3 | 10.8 | 10.0 | 12.7 | 15.3 | 14.4 | 12.2 | 13.0 |
| Loss compliance (kg · f/cm.$^2$)$^{-1}$ | 2.78 × 10$^{-3}$ | 3.44 × 10$^{-3}$ | 1.59 × 10$^{-3}$ | 2.43 × 10$^{-3}$ | 2.12 × 10$^{-3}$ | 2.36 × 10$^{-3}$ | 1.83 × 10$^{-3}$ | 1.98 × 10$^{-3}$ |
| Integral of loss coefficient | | | | | | | | |
| $\int \tan \delta dT$ (T: −30° to −15° C.) | 4.95 | 3.59 | 7.88 | 4.99 | 8.23 | 8.41 | 8.30 | 8.30 |
| Processability | | | | | | | | |
| Bagging property | none | none | large | none | middle | none | none | none |
| Sheet skin | good | good | rough | good | good | good | good | good |
| Tackiness index | 850 | >1500 | 100 | 270 | 200 | 390 | 450 | 590 |
| Tearing strength at 170° C. (kg · f/cm.) | 23 | 30 | 10 | 12 | 11 | 13 | 14 | 11 |
| Rolling resistance index | 100 | 92 | 84 | 92 | 96 | 94 | 89 | 91 |
| Wet grip index | 100 | 88 | 104 | 99 | 106 | 108 | 108 | 108 |

It is observed in Table 2 that the bagging property, sheet skin and tackiness index of the rubber compositions of Examples 1 to 3 containing high molecular and low molecular styrene-butadiene rubbers are improved as compared with the composition of Comparative Example 3 containing a high molecular styrene-butadiene rubber alone as a rubber component.

Although the compositions of the present invention (Examples 1 to 3) show a decreasing tendency in rolling resistance characteristic as compared with the composition of Comparative Example 3, they are on the same level as the composition of Comparative Example 2 containing natural rubber as a rubber component which has been considered to be excellent in rolling resistance characteristic.

It is also observed in Table 2 that the compositions of the present invention have a largely improved wet grip characteristic as compared with the compositions containing a single rubber as a rubber component.

EXAMPLES 4 TO 6 AND COMPARATIVE EXAMPLES 6 AND 7

Various rubber compositions were prepared in the same manner as in Examples 1 to 3 except that a rubber or a blend of a high molecular weight styrene-butadiene rubber and a low molecular weight butadiene rubber as shown in Table 3 was used as a rubber component, and the measurement of the characteristics of the compositions was made.

The results are shown in Table 4 together with the results of Comparative Example 1 containing a commercially available high molecular weight styrene-butadiene rubber as a rubber component and Comparative Example 2 containing natural rubber as a rubber component.

TABLE 3

|  | Com. Ex. 6 | Com. Ex. 7 | Ex. 4 | Ex. 5 | Ex. 6 |
|---|---|---|---|---|---|
| Styrene-butadiene rubber (SBR) | | | | | |
| Intrinsic viscosity [η] | 3.21 | 3.21 | 3.21 | 3.99 | 4.42 |
| Styrene content (%) | 20 | 20 | 20 | 20 | 20 |
| 1,2-Bonding content in butadiene component (mol %) | 65 | 65 | 65 | 65 | 65 |
| Mw/Mn ratio | 1.56 | 1.56 | 1.56 | 1.42 | 1.40 |
| Butadiene rubber (BR) | | | | | |
| Intrinsic viscosity [η] | — | 0.61 | 0.66 | 0.66 | 0.66 |
| 1,2-Bonding content (mol %) | — | 25 | 78 | 78 | 78 |
| Mw/Mn ratio | — | 1.20 | 1.35 | 1.35 | 1.35 |
| SBR/BR ratio | — | 80/20 | 80/20 | 80/20 | 80/20 |
| Weighted average intrinsic viscosity [η̄] | — | 2.69 | 2.70 | 3.32 | 3.67 |

TABLE 4

|  | Com. Ex. 1 | Com. Ex. 2 | Com. Ex. 6 | Com. Ex. 7 | Ex. 4 | Ex. 5 | Ex. 6 |
|---|---|---|---|---|---|---|---|
| Viscoelasticity | | | | | | | |
| Loss modulus (kg · f/cm.$^2$) | 16.3 | 10.8 | 12.3 | 12.7 | 15.1 | 12.7 | 10.9 |
| Loss compliance (kg · f/cm.$^2$)$^{-1}$ | 2.78 × 10$^{-3}$ | 3.44 × 10$^{-3}$ | 1.55 × 10$^{-3}$ | 2.43 × 10$^{-3}$ | 1.98 × 10$^{-3}$ | 2.15 × 10$^{-3}$ | 2.03 × 10$^{-3}$ |
| Integral of loss coefficient | | | | | | | |
| $\int \tan \delta dT$ (T: −30° to −15° C.) | 4.95 | 3.59 | 8.45 | 4.99 | 8.78 | 8.60 | 8.57 |
| Processability | | | | | | | |
| Bagging property | none | none | large | none | none | none | none |
| Sheet skin | good | good | rough | good | good | good | good |
| Tackiness index | 850 | >1500 | 110 | 270 | 480 | 540 | 420 |
| Tearing strength at 170° C. (kg · f/cm.) | 23 | 30 | 11 | 12 | 12 | 13 | 12 |

TABLE 4-continued

|  | Com. Ex. 1 | Com. Ex. 2 | Com. Ex. 6 | Com. Ex. 7 | Ex. 4 | Ex. 5 | Ex. 6 |
| --- | --- | --- | --- | --- | --- | --- | --- |
| Rolling resistance index | 100 | 92 | 88 | 92 | 94 | 91 | 87 |
| Wet grip index | 100 | 88 | 108 | 99 | 108 | 108 | 108 |

It is observed in Table 4 that the compositions of the present invention (Examples 4 to 6) have excellent processability and wet grip characteristic. With respect to the rolling resistance, it is also observed that the compositions of the invention are on the same level as the composition of Comparative Example 2 containing natural rubber as a rubber component which has been considered to be excellent in rolling resistance characteristic.

EXAMPLES 7 TO 12

Various rubber compositions were prepared in the same manner as in Examples 1 to 3 except that a rubber blend of a high molecular styrene-butadiene rubber and a low molecular styrene-butadiene or butadiene rubber used in Examples 1 to 6 was employed in combination with another diene rubber to provide a rubber component. The measurement of the characteristics of the compositions was made.

The results are shown in Table 5.

TABLE 5

|  | Ex. 7 | Ex. 8 | Ex. 9 | Ex. 10 | Ex. 11 | Ex. 12 |
| --- | --- | --- | --- | --- | --- | --- |
| Rubber component (part) |  |  |  |  |  |  |
| Blend | Ex. 1 | Ex. 2 | Ex. 3 | Ex. 4 | Ex. 5 | Ex. 6 |
|  | 80 | 80 | 80 | 80 | 80 | 80 |
| Natural rubber | 20 | 20 | 20 | 20 | 20 | 20 |
| Viscoelasticity |  |  |  |  |  |  |
| Loss modulus (kg · f/cm.$^2$) | 12.5 | 11.3 | 11.8 | 13.8 | 11.0 | 10.7 |
| Loss compliance (kg · f/cm.$^2$)$^{-1}$ | $2.88 \times 10^{-3}$ | $2.95 \times 10^{-3}$ | $2.76 \times 10^{-3}$ | $2.39 \times 10^{-3}$ | $2.55 \times 10^{-3}$ | $2.67 \times 10^{-3}$ |
| Integral of loss coefficient | 7.80 | 7.75 | 7.69 | 7.99 | 7.76 | 7.48 |
| Processability |  |  |  |  |  |  |
| Bagging property | none | none | none | none | none | none |
| Sheet skin | good | good | good | good | good | good |
| Tackiness index | 1050 | 980 | 1170 | 1200 | 1160 | 1120 |
| Tearing strength measured at 170° C. (kg · f/cm.) | 20 | 21 | 19 | 19 | 18 | 18 |
| Rolling resistance index | 93 | 91 | 91 | 93 | 89 | 89 |
| Wet grip index | 106 | 106 | 106 | 106 | 106 | 106 |

It is observed in Table 5 that the processability (tackiness index) of a rubber composition and the basic characteristics such as tearing strength of the cured rubber obtained from the composition are improved by employing a mixture of the high molecular and low molecular rubbers in combination with natural rubber.

In addition to the ingredients used in the Examples, other ingredients can be used in the Examples as set forth in the specification to obtain substantially the same results.

What we claim is:

1. An elastomer composition comprising a mixture of (a) a linear high molecular weight styrene-butadiene rubber having an intrinsic viscosity of 2.0 to 6.0 in toluene at 30° C. and (b) a linear low molecular weight styrene-butadiene rubber having an intrinsic viscosity of from not less than 0.8 to less than 2.0 in toluene at 30° C., said high molecular weight styrene-butadiene rubber and low molecular weight styrene-butadiene rubber having a ratio of the weight average molecular weight to the number average molecular weight of not more than 2.0, a styrene content of 15 to 35% by weight and a 1,2-bonding content in the butadiene component of 40 to 70% by mole, the weighted average intrinsic viscosity of said high molecular weight styrene-butadiene rubber and said low molecular weight styrene-butadiene rubber being from not less than 1.8 to less than 3.0 and the difference in the intrinsic viscosity between said high molecular weight styrene-butadiene rubber and said low molecular weight styrene-butadiene rubber being from not less than 0.5 to less than 2.5.

2. The composition of claim 1, wherein said mixture consists of 25 to 75% by weight of the high molecular weight styrene-butadiene rubber (a) and 75 to 25% by weight of the low molecular weight styrene-butadiene rubber (b).

3. The composition of claim 1, wherein said mixture is employed in combination with another rubber selected from the group consisting of natural rubber and synthetic isoprene rubber to provide a rubber component, the ratio of said mixture to said another rubber being 95/5 to 50/50 by weight.

4. An elastomer composition comprising a mixture of (a) a linear high molecular weight styrene-butadiene rubber having a ratio of the weight average molecular weight to the number average molecular weight of not more than 2.0, a styrene content of 15 to 35% by weight, a 1,2-bonding content in the butadiene component of 40 to 70% by mole and an intrinsic viscosity of 2.0 to 6.0 in toluene at 30° C., and (b) a linear low molecular weight butadiene rubber having a 1,2-bonding content of 30 to 80% by mole and an intrinsic viscosity of from not less than 0.1 to less than 2.0 in toluene at 30° C., the weighted average intrinsic viscosity of said high molecular weight styrene-butadiene rubber and said low molecular weight butadiene rubber being not less than 2.0 and the difference in the intrincic viscosity between said high molecular wight styrene-butadiene rubber and said low molecular weight butadiene rubber being not less than 0.5.

5. The composition of claim 4, wherein said mixture consists of 20 to 90% by weight of the high molecular weight styrene-butadiene rubber (a) and 80 to 10% by weight of the low molecular weight butadiene rubber (b).

6. The composition of claim 4, wherein said mixture is employed in combination with another rubber selected from the group consisting of natural rubber and synthetic isoprene rubber to provide a rubber component, the ratio of said mixture to said another rubber being 95/5 to 50/50 by weight.

* * * * *